United States Patent Office 3,361,776
Patented Jan. 2, 1968

3,361,776
IMIDAZOLE CATALYSIS OF HIGH MOLECULAR
WEIGHT ANHYDRIDE ESTERIFICATION
Louis De Vries, Richmond, Calif., assignors to Chevron Research Company, a corporation of Delaware
No Drawing. Filed Aug. 28, 1964, Ser. No. 392,936
3 Claims. (Cl. 260—410.9)

ABSTRACT OF THE DISCLOSURE

Esterification of high molecular weight carboxylic acid anhydrides is catalyzed with imidazole or alkyl substituted imidazole.

---

This invention concerns the esterification of high molecular weight anhydrides. More particularly, this invention concerns the use of imidazole type catalysts in the esterification of high molecular weight anhydrides.

Carboxylic anhydrides are popularly used for the formation of carboxylic esters. It was found, however, that with high molecular weight anhydrides, particularly those prepared by the reaction between a polyolefin and maleic anhydride, bringing the alcohol together with the anhydride at elevated temperatures for extended periods of time was insufficient to prepare the ester. This was found to be true with both very high and relatively low molecular weight alcohols.

It has now been found that high molecular weight anhydrides can be easily and efficiently esterified with a wide variety of alcohols by bringing together the alcohol and the anhydride in the presence of an imidazole catalyst.

By high molecular weight anhydride is intended an equivalent weight of about 1,000 and usually not exceeding 40,000, although the upper limit is one of convenience and not critical to this invention. (By equivalent weight is intended the weight per anhydride unit.) More usually, the equivalent weight will be in the range from about 1,500 to 15,000. The alcohols may vary from simple monohydroxylic alcohols to hydroxylated high molecular weight polymers, such as polymethacrylates, polyvinyl acetate, etc. The imidazole catalysts will be either the parent compound or simple derivatives thereof.

For the most part, cyclic anhydrides will be used, which will result in the mono-ester-monocarboxylic acid as the product. When non-cyclic anhydrides are used, two molecules will be formed; one the ether, the other the carboxylic acid. These reactions are illustrated by the following equations:

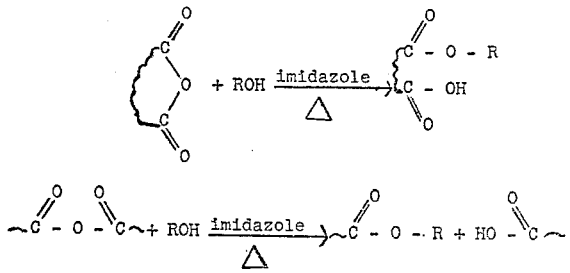

The esterification may be carried out in the presence of an inert diluent or solvent. Inert diluents will generally be of from 6 to 20 carbons and may include hydrocarbons—aliphatic and aromatic—ethers, halohydrocarbons, etc. Preferred diluents are aromatic hydrocarbons of from 6 to 15 carbons. The preferred solvents are illustrated by benzene, cumene, cymene, Decalin, etc. Usually, the solvent will be chosen because of ease of manipulation and separation from the reactants and final product. With the lower molecular weight alcohols, the alcohol itself may be conveniently used as the solvent.

When using an inert diluent, the concentration of the anhydride will generally be in the range from about 0.005–0.5 equivalent/kg., more usually from about 0.01–0.1 equivalent/kg. The concentration of the alcohol may be varied more widely, depending on the particular alcohol, but will generally be from about 0.001 to 0.2, more usually about 0.01 to 0.2 mole/kg., depending on the concentration of the anhydride.

Generally, the equivalent ratio of anhydride to alcohol will be about 1:1, although a small excess of the alcohol is preferred. More usually, the equivalent ratio of anhydride to alcohol will be in the range of about 1:1–1.5. However, these ratios may be varied widely, depending upon which reagent is the more expensive, and the desire, therefore, to minimize that reagent's mechanical losses.

While elevated temperatures are preferred, ambient temperatures (20° C.) may be used. Generally, the temperature will be in the range from about 20° to 125° C., more usually in the range from about 25° to 110° C., and preferably in the range from about 50° to 110° C. The pressure may be ambient or autogenous, although higher and lower pressures may be used as convenient. By using a solvent which boils at the desired reaction temperature, the refluxing of the solvent can be used to control the reaction temperature.

The time for the reaction will be dependent upon the particular reactants and the temperature used. Usually, the time for the reaction will be at least one hour, and generally not more than 100 hours. More usually, the time will range from about 2 to 50 hours.

The process can be carried out batchwise or continuously, depending on convenience, the amount of materials, the particular materials, the size of the reactor, etc.

Turning now to the reactants. As already indicated, the anhydrides will range from about 1,000 to about 40,000 equivalent weight, more usually from about 1,500 to 15,000 equivalent weight. The anhydrides may be either cyclic or non-cyclic, but the cyclic anhydrides are preferred. In order to obtain the high molecular weight anhydrides, polymers will generally be prepared which can then be used to prepare the carboxylic acid or anhydride. Generally, the carboxylic acid anhydrides used in this invention will be derived from polymers of hydrocarbon alpha-olefins, varying from 2 to 20 carbons, more usually from 2 to 16 carbons.

The alpha-olefins used in the polymers may be normal or branched. Illustrative of such alpha-olefins are ethylene, propylene, butene-1, isobutylene, pentene-1, hexene-1, 4-methylpentene-1, octene-1, decene-1, hexadecene-1, eicosene-1, etc.

The poly(alpha-olefins) may be prepared by means known in the art. Various catalysts may be used to prepare the atactic or tactic poly(alpha-olefins). The polymerization may be catalyzed, for example, by "Ziegler-type" catalysts, e.g., trialkyl aluminum and titanium trichloride; Lewis acid catalyst, e.g., aluminum chloride; free radical catalysts, etc.

The polymers may be homo- or copolymers having one or more olefins. The copolymers may be random or block copolymers.

The carboxylic acids or anhydrides may then be formed from the polymers by various means known in the art. The olefinic unsaturation present in the polymer may be oxidized to a carboxylic acid, carbonylated with carbon monoxide, reacted with ketene, etc. The resulting monocarboxylic acid may then be used to form the anhydride. Preferably, the polyolefin will be combined with maleic anhydride, by means known in the art, to form the cyclic anhydride directly. See e.g. U.S. Patent Nos. 3,018,247 and 3,131,150.

The high molecular weight succinic anhydrides are the preferred reactants and have the following formula:

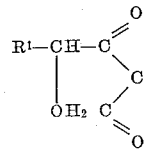

wherein $R^1$ is a hydrocarbyl, more usually hydrocarbenyl (by hydrocarbyl is intended an organic radical composed solely of carbon and hydrogen, which may be aliphatic, alicyclic, or aromatic, or combinations thereof, e.g., aralkyl; hydrocarbenyl is an organic radical composed solely of carbon and hydrogen and has a portion of the molecule which is aliphatic or cycloaliphatic and has an aliphatic double bond), group of from about 1,000 to 40,000 equivalent weight. (The polyolefin may be $10^6$ or more molecular weight and have a plurality of maleic anhydride units.) Usually $R^1$ is alkenyl.

Illustrative of various alkenyl succinic anhydrides are polyisobutenyl succinic anhydride, polypropenyl succinic anhydride, polyoctenyl succinic anhydride, polydodecenyl succinic anhydride, polyethenyl succinic anhydride, etc.

Any esterifiable hydroxylic compound of one carbon or more may be used in this invention. However, for most purposes, hydroxylic compounds, usually alcohols, of at least 6 carbons will be used. The alcohols may vary from relatively low molecular weight to high molecular weight hydroxylated polymers. Generally, the alcohol will be of from about 100 to 60,000 molecular weight.

The hydroxylic group may be bonded to various organic radicals. Included among these radicals are hydrocarbyl radicals (see the definition above), polyesters, polyethers, polyamides, polyureas, etc. The particular organic residue bonded to the hydroxyl group is not essential to this invention and may be varied widely, as exemplified by the above illustrations. Preferably, the organic radical is hydrocarbyl, polyether or polyester.

The hydrocarbon radical of the hydroxylic compound can be aliphatic, alicyclic or aromatic, or combinations thereof, as already indicated. The alcohol may be hydrocarbyl alcohols, such as stearyl alcohol, oleyl alcohol, dodecyl alcohol, eicosyl alcohol, cholesterol, benzyl alcohol, cyclohexyl alcohol, decalol, polystyrenyl alcohol, polyethenyl alcohol, etc. For the most part, the non-polymeric alcohol will be of from 6 to 35 carbon atoms.

The alcohol can also be derived from the polymerization of alkylene oxide, particularly ethylene oxide and propylene oxide, i.e., oxides of from 2 to 3 carbon atoms.

The polymers of ethylene oxide having one alkyl end group are known in the art as carbowaxes.

Also included among the useful alcohols are polymers containing ester functionalities, either addition polymers or condensation type polymers. Illustrative of ester containing addition polymers are acrylates, methacrylates, vinyl alkanoates, etc. Illustrative of ester containing condensation type polymers are polybutyrolactone, polycaprolactone, etc.

The addition polymerizable monomers can be hydroxyl terminated by various means known in the art. For example, telogens may be used which have both a chain carrier and an hydroxyl group, e.g., mercaptoethanol. The polymer of a lactone will inherently have a hydroxyl terminal group. The polymeric alcohols will generally be of from about 100 to 1000 molecular weight.

The alcohols used in this invention may be primary or secondary, that is, have from 1 to 2 hydrogens bonded to the same carbon as the hydroxyl group, but will more usually be primary. While tertiary alcohols may be used, they are not preferred.

The imidazole catalyst is free of substituents other than lower alkyl groups and has the following formula:

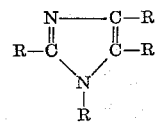

wherein the various R's are hydrogen or hydrocarbyl of from 1 to 12 carbons, more usually of from 1 to 6 carbons. Preferably, the R's are hydrogen.

The following examples are offered by way of illustration and not by way of limitation.

*Example I*

Into a reaction flask was introduced 60 g. of 15 wt. percent concentration of a maleic anhydride modified poly(cracked wax)olefin (C9-20) ($2.24 \times 10^{-3}$ equivalents of succinic anhydride per 1000 gms. of polymer; polymer molecular weight $\sim 2.5 \times 10^5$) in benzene, 50 ml. of benzene, 0.47 g. of lauryl alcohol (0.0025 mole) and 0.34 g. of imidazole (0.005 mole) and the mixture heated for 15 hours at 130° F., followed by 2½ hours at reflux. The reaction was then stopped by cooling and the mixture analyzed by infra-red spectroscopy. The infra-red spectrum showed the complete absence of the characteristic anhydride peak (signifying that all of the anhydride had reacted) and was consistent with a monocarboxylic acid monoester product.

The following table illustrates a number of examples carried out as described above.

TABLE 1

| Polymer Adduct [1] | | Alcohol | | Imidazole, moles/kg. | Reaction Temp., °C. | Time for Esterification, hours |
|---|---|---|---|---|---|---|
| Equivalent Weight | Conc., eq./kg. | Type [2] | Conc., eq./kg. | | | |
| 8,000 | 0.0125 | Carbowax 550 | 0.015 | 0.025 | 95-100 | 50 |
| 4,000 | 0.014 | ___do___ | 0.018 | 0.035 | 50-60 | 20 |
| 5,100 | 0.014 | Carbowax 750 | 0.015 | 0.030 | Room | <42 |
| 4,000 | 0.083 | ___do___ | 0.100 | 0.166 | 60 | 23 |
| 4,000 | 0.018 | ___do___ | 0.023 | 0.037 | 60 | <21 |
| 4,000 | 0.017 | ___do___ | 0.020 | 0.033 | 90 | 20 |
| 5,100 | 0.021 | Carbowax 350 | 0.051 | 0.051 | 90 | 4.5 |
| 4,000 | 0.021 | Dodecyl | 0.021 | 0.021 | 54 | ([4]) |
| 4,000 | 0.024 | Hydroxy-terminated Methyl Methacrylate Polymer.[3] | 0.028 | 0.048 | 93 | 23 |
| 4,000 | 0.025 | Hydroxy-terminated Methly Acrylate Polymer.[3] | 0.030 | 0.050 | 96 | 17 |
| 4,000 | 0.035 | Polycaprolactone (630-640 eq. wt.). | 0.035 | 0.070 | 90 | 24 |

[1] Maleic anhydride modified poly(cracked wax)olefin as described in Example I.
[2] Carbowax is a polyethylene glycol of the formula:

$$A(OCH_2CH_2)nOH$$

where A is methyl and $n$ is the number of recurring units. the number with the name indicates the approximate average molecular weight.
[3] The hydroxy-terminated addition polymers are prepared as described in Example A.
[4] Incomplete at 18.

Example A

Into a refluxing solution of 40 gms. of methyl methacrylate, 60 gms. of benzene and 6.4 gms. of 2-mercaptoethanol was added 2 ml. portions at 15-minute intervals of a solution of 21 gms. of azobisisobutylronitrile in 85 gms. of benzene, the addition requiring about 6.5 hours. The mixture was allowed to cool and the polymer precipitated with pentane and then repeatedly dissolved in benzene and precipitated with pentane. The equivalent weight was 715.

The methyl acrylate polymer prepared analogously had an equivalent weight of 685.

When the imidazole was not present in the reaction mixture, little if any reaction occurred during extended periods of time.

The high molecular weight esters which can be prepared by this invention find a variety of uses. They can be used as lubricating oil additives, plasticizers, as well as the numerous other well-known uses for high molecular weight esters.

As will be evident to those skilled in the art, various modifications on this process can be made or followed, in the light of the foregoing disclosure and discussion, without departing from the spirit or scope of the disclosure and discussion, without departing from the spirit or scope of the disclosure or from the scope of the following claims.

I claim:
1. A method for preparing esters from high molecular weight anhydrides having the formula:

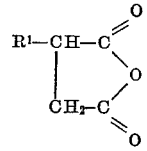

wherein $R^1$ is an alkenyl radical of from about 1,000 to 40,000 equivalent weight, which comprises contacting said high molecular weight anhydride with a monohydroxylic compound of from about 100 to 60,000 molecular weight in the presence of imidazole for a time sufficient to esterify said high molecular weight anhydride, wherein said imidazole is of the formula:

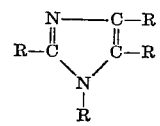

wherein R is hydrogen or alkyl of from 1 to 12 carbon atoms.

2. A method according to claim 1 wherein said monohydroxylic compound is a polyalkylene oxide alcohol.

3. A method according to claim 1 wherein said monohydroxylic compound is a monohydroxylated polyester.

No references cited.

HENRY R. JILES, *Primary Examiner.*